United States Patent [19]

Schendel

[11] Patent Number: 5,204,082
[45] Date of Patent: Apr. 20, 1993

[54] SULFUR DIOXIDE GENERATION BY SUBMERGED COMBUSTION AND REDUCED THERMAL CYCLING BY USE OF A HOT RECYCLE OF SULFUR

[75] Inventor: Ronald L. Schendel, Manhattan Beach, Calif.

[73] Assignee: C.F. Braun Inc., Alhambra, Calif.

[21] Appl. No.: 732,110

[22] Filed: Jul. 18, 1991

[51] Int. Cl.$^5$ ............................................. C01B 17/48
[52] U.S. Cl. ..................................... 423/539; 423/543
[58] Field of Search ..................................... 423/543, 539

[56] References Cited

U.S. PATENT DOCUMENTS

| | | |
|---|---|---|
| 376,836 | 7/1989 | Davis et al. |
| 2,595,447 | 5/1952 | Braun ........................ 23/179 |
| 2,726,933 | 12/1955 | Merriam et al. ................... 423/543 |
| 2,813,006 | 11/1957 | Hayworth et al. ................. 423/539 |
| 3,803,298 | 4/1974 | Guth et al. ........................ 423/543 |
| 4,046,867 | 9/1977 | Seeling et al. ..................... 423/543 |
| 4,481,181 | 11/1984 | Norman ......................... 423/573 G |
| 4,837,001 | 6/1989 | Miller ............................. 423/563 |
| 4,966,757 | 10/1990 | Lewis et al. ........................ 422/62 |

OTHER PUBLICATIONS

"Modifying the Viscosity of Sulfur" by Rocco Fanelli Industrial and Engineering Chemistry, vol. 38, No. 1, pp. 39–43, Jan. 1946.

Paskall, Harold G., "Sulfur condenser function and problem areas," pp. 1–11, Western Research Sulfur Seminar (Amsterdam 1981).

Fanelli, Rocco, "Modifying the Viscosity of Sulfur," vol. 38, No. 1 Industrial and Engineering Chemistry, pp. 39–43 (1946) Jan.

Primary Examiner—Gary P. Straub
Assistant Examiner—Timothy C. Vanoy
Attorney, Agent, or Firm—Lyon & Lyon

[57] ABSTRACT

A method of making high purity sulfur dioxide by submerged combustion is disclosed. Sulfur is combusted in a first liquid pool with an oxygen-containing gas and the vapor effluent is removed and cooled in a first cooling zone to a temperature above approximately 600° F. The condensed sulfur is separated as liquid sulfur from the vapor in the cooled effluent and passed back to the reactor as the supply of liquid sulfur for conversion to sulfur dioxide.

8 Claims, 2 Drawing Sheets

SULFUR DIOXIDE GENERATION BY SUBMERGED COMBUSTION AND REDUCED THERMAL CYCLING BY USE OF A HOT RECYCLE OF SULFUR

BACKGROUND OF THE INVENTION

1. Field of the Invention

This invention relates to the generation of high purity sulfur dioxide by submerged combustion in liquid sulfur. The invention especially relates to the integration of a recycle of sulfur maintained at relatively high temperature to eliminate plugging and other control problems associated with unusual viscosity characteristics of elemental sulfur such as temperature cycling of liquid sulfur in the reactor.

2. Description of the Prior Art

High purity sulfur dioxide can be generated by the Calabrian process, as described in U.S. patent application, Ser. No. 07/376,836, "PROCESS FOR HIGH PURITY SULFUR DIOXIDE PRODUCTION", Davis et al., filed Jul. 7, 1989, and other processes employing submerged combustion as described subsequently herein. In these processes, the sulfur dioxide is formed when an oxygen-containing gas is injected beneath the surface of a pool of molten sulfur maintained above its auto-ignition temperature. Before travelling upward and reaching the surface of the liquid sulfur, oxygen in the oxygen-containing gas is essentially completely consumed in the combustion reaction of sulfur to sulfur dioxide. One distinct advantage of submerged combustion is the production of a sulfur dioxide stream essentially free of sulfur trioxide When oxygen is used as the oxygen-bearing gas, recovery and purification of the sulfur dioxide is further simplified.

For the processes using submerged combustion to make sulfur dioxide, the heat of combustion from the sulfur dioxide reaction heats both the liquid sulfur and the gas passing through it. Because the liquid sulfur is maintained at or above its auto-ignition temperature and is heated continuously by the combustion reaction, substantial amounts of sulfur are vaporized into the sulfur dioxide containing gas leaving the liquid sulfur. This effect was recognized in U.S. Pat. No. 2,595,447 to take advantage of a subsequent combustion of the vaporized sulfur.

When sulfur dioxide is desired as the product of submerged combustion, it is necessary to remove the sulfur vaporized into the sulfur dioxide containing gas to a level required by the downstream process user. The vaporized sulfur is most effectively removed from the sulfur dioxide containing gas by indirect heat transfer causing condensation of the sulfur but not of the sulfur dioxide. Because the sulfur dioxide containing gas is typically cooled to 300° F. or less, condensing sulfur passes through a high viscosity transition in the temperature range of 310° to 600° F. The viscosity of liquid sulfur is relatively low outside of this temperature range (less than 2000 cps), but within it the viscosity rises to approximately 92,000. Such a rise in viscosity is noted by Paskall in FIG. 5 of the article "Sulphur Condenser Function and Problem Areas" in the Western Research Sulphur Seminar (Amsterdam, 1981). High viscosity liquid sulfur accumulates in the condensers of submerged combustion processes and interferes with heat transfer and free flow of liquid sulfur from the condenser. Plugging and erratic behavior of such condensers is a major concern in applying the submerged combustion processes and has limited commercial application.

Compounding this problem of liquid sulfur viscosity in the condenser has been the increasing, advantageous use of pure oxygen as the oxygen-containing gas for submerged combustion. Pure oxygen is used as the oxygen-containing gas to improve recovery and purification of the sulfur dioxide from the vapor, since, as compared to the use of the less costly air, nitrogen has been removed as a diluent. While advantageous for final recovery and purification of sulfur dioxide, elimination of nitrogen from the oxygen-containing gas increases the amount of sulfur vaporized into the sulfur dioxide containing gas while at the same time reducing the amount of non-condensable vapor passing through the indirect heat transfer cooling step.

Thus, in using pure oxygen as the oxygen-containing gas, submerged combustion processes must condense relatively more vaporized sulfur from the sulfur dioxide containing gas, adding to the problem of liquid sulfur removal from the condenser. Also, less non-condensable vapor passes through the condenser in relation to the amount of sulfur condensed there, resulting in reduced vapor cooling requirements in the condenser. Whatever the benefit of reducing non-condensable vapor cooling in this cooling step, such benefit is negligible when compared to the problem of removing additional high viscosity liquid sulfur from the condenser.

Therefore, the heat of combustion from the sulfur dioxide reaction described in the prior art is typically absorbed by cooled liquid sulfur added to the combustion zone. That cooled liquid sulfur is heated by the combustion reaction and is withdrawn as hot liquid or vaporized sulfur to be cooled and returned to the combustion zone.

U.S. Pat. No. 2,726,933 directly quenches with liquid sulfur the gas leaving the surface of the liquid sulfur in the combustion zone to produce a vapor at 550° to 650° F. (substantially below the boiling point of sulfur for the reactor pressure). A second direct quench with liquid sulfur reduces the gas temperature to 250° to 310° F. The liquid sulfur heated by the direct quenches is withdrawn from the respective pools of liquid sulfur, cooled, and returned to the direct quench steps. The total sulfur recirculation rate to the direct quench is 25 to 60 times the sulfur consumption rate. Because U.S. Pat. No. 2,726,933 prefers that the majority of the heat of combustion is absorbed by the cooled liquid sulfur fed directly to the combustion zone, the combustion zone must operate as near the auto-ignition temperature as possible in order to accommodate the 550° to 650° F. temperature range of the vapor leaving the zone of the first quench. This presents operational problems if the temperature of the liquid sulfur drops below the auto-ignition temperature and the combustion reaction stops.

U.S. Pat. No. 4,046,867 is directed to the scrubbing of the sulfur dioxide containing gas generated by a submerged combustion process, with dilute ammonia to remove the last traces of elemental sulfur. The patent additionally discloses a vertical tube condenser situated above the pool of liquid sulfur where submerged combustion takes place. Vaporized sulfur condenses in the vertical tubes. Some or all of the condensed sulfur drains directly back to the pool of liquid sulfur.

The outlet temperature of the condenser in U.S. Pat. No. 4,046,867 is preferably below 310° F., which is repeatedly emphasized as the highest condenser outlet temperature to be used. The vapor from the condenser outlet is further subjected to direct contact with slightly cooler liquid sulfur. This liquid sulfur contact step is not intended to perform significant cooling of the vapor, at the most cooling it from 310° or 300+ F. to over 240° F. In addition, the vertical tube condenser permits condensation of sulfur from the upwardly flowing, sulfur dioxide containing gas on the inside surface of vertical condenser tubes. Without substantial additional cooling of the liquid sulfur in the reactor zone and a subsequent reduction of vaporized sulfur entering the condenser, the quantity of sulfur condensed from the reactor effluent will necessarily tend to plug the condenser tubes due to the very high viscosity zone encountered. Indeed, the detailed description of the invention states that the "Temperature of the sulfur in sulfur dioxide generator (4) is between about 550° F. and desirably below its boiling point of 832° F." The detailed description further states "If desired, pool of molten sulfur (5) may be cooled, as by externally located heat exchange means (not shown)." To maintain the desirable temperature in the sulfur dioxide generator below the sulfur boiling point such heat exchange is required. Merely returning cooled, condensed sulfur to the reactor in the manner shown in the figures does not reduce sulfur dioxide generator temperature to below the boiling point of liquid sulfur for the conditions described in the patent.

The vertical tube sulfur condenser has been almost entirely eliminated from industrial applications, as noted by Paskall and Sames, "Sulphur Condenser Function and Problem Areas" (page 7), Western Research Publishing Company, 1990. One skilled in the art would thus not use the condenser described in U.S. Pat. No. 4,046,867. Nothing in that patent suggests what type of heat transfer device might replace its vertical tube condenser in sequence and function and still produce the anticipated operation.

The Calabrian process, among its other advantages, solves the problem of replacing the vertical tube condenser of U.S. Pat. No. 4,046,867. Vapor from the liquid sulfur pool where submerged combustion takes place is cooled in two steps. First, a cooling jacket applied to a portion of the vapor space of the reactor condenses some sulfur on the wall of the reactor. The condensed sulfur then drains back to the liquid sulfur pool in the reactor. The temperature of the vapor leaving the reactor is preferably 800° F.

A subsequent condenser further cools the vapor leaving the reactor and allows the sulfur condensed there to flow to a sulfur storage tank. The outlet temperature of the inclined condenser is maintained preferably between 240° to 260° F. It is the partial condensation in the reactor and/or the unique configuration and orientation of the condenser which overcomes the viscosity problem described above.

In the sulfur storage tank, liquid sulfur from two sources mix. The two sources of liquid sulfur are (1) that condensed in the condenser and (2) liquid sulfur from a make-up supply. From this pool of mixed liquid sulfur in the sulfur storage tank, liquid sulfur flows by gravity to the reactor.

SUMMARY OF THE INVENTION

The present invention is an improved method for making high purity sulfur dioxide by submerged combustion. For a submerged combustion reactor, such as that disclosed in the prior art, in which an oxygen-bearing gas is introduced below the surface of a pool of molten sulfur, the vapor from the surface of the liquid sulfur in the reactor is, in the present invention, first indirectly cooled to a temperature above approximately 600° F. and introduced to a first drum, a seal leg, or other means to separate vapor and liquid sulfur streams. Liquid sulfur is then flowed to the reactor to supply the liquid sulfur required for conversion to sulfur dioxide and to absorb the heat of combustion by vaporization.

The present invention therefore creates a recycle of sulfur through the reactor where liquid sulfur in the recycle is maintained above 600° F. at low viscosity. The present invention is thus distinguished from the prior art by (1) maintaining the effluent temperature of the first cooling step above 600° F., (2) separating condensed liquid sulfur and vapor after the first cooling step, and (3) maintaining the pool of liquid sulfur in the reactor at its boiling point.

The lower temperature limit of 600° F. for this first cooling step is chosen to avoid the high viscosity transition of liquid sulfur between the temperatures of 310° and 600° F. Below 600° F., the viscosity of liquid sulfur rises to very high levels and does not decrease again until the liquid sulfur cools to 310° F. Advantageously, the majority of sulfur condensation from the reactor vapor can thus be done by a single indirect heat exchange where the high viscosity transition is entirely avoided. As described above, high viscosity liquid sulfur in indirect heat transfer equipment interferes with the free flow of liquid sulfur from that equipment.

The Calabrian process, which is the only submerged combustion process known to be successfully used in commercial practice, deals with this problem of the free flow of liquid sulfur from its condenser in a different manner. In addition to partial condensation in the vapor space of the reactor, the Calabrian process uses a unique and carefully designed configuration of the condenser in which substantial amounts of sulfur are allowed to pass through the high viscosity region without obstructing the flow of vapor.

For the present invention, vapor from the first drum is further cooled from 600° F. to less than 310° F. in a second indirect heat transfer. The sulfur condensed in that second cooling step passes through the high viscosity transition. However, only approximately 3 to about 20 percent of the total duty of the first and second cooling steps is done in the second cooling step. The amount of sulfur condensing is small relative to the non-condensable vapor flow. Additionally, the sulfur at the tube surface is always at a low viscosity because the temperature at the tube wall is maintained between about 240° and about 310° F.

Thus, even though the bulk of the sulfur condensed in the second condenser passes through a region of high viscosity, it is not present in sufficient quantities to impede the flow of vapor. Because the viscosity of the liquid at the wall is always low, the liquid sulfur, even during its high viscosity transition, continues to flow without dangerous build up which could, with high viscosity, cause plugging. The small amount of liquid sulfur produced may be separated from the vapor at the end space of the second cooling zone or in a second drum.

The vapor effluent of the second cooling step contains all the sulfur dioxide produced in the reactor. Elemental sulfur in that vapor has been reduced to sufficiently low levels so that the vapor stream may be used in downstream processes. The effluent of the second cooling step may also be further processed in conventional manner to remove the last traces of elemental sulfur.

Liquid sulfur may be pumped from the second drum to the first drum or optionally the second drum is eliminated and liquid sulfur is allowed to flow by gravity from the second cooling step to the first drum. The demand rate for liquid sulfur at the first drum is equal to elemental sulfur withdrawn from the first drum in its vapor stream plus that sulfur consumed in the production of sulfur dioxide. That vapor stream contains the (1) sulfur dioxide produced in the reactor, (2) inerts that may have entered the reactor with the oxygen-containing gas, and (3) elemental sulfur saturating the gas formed by components (1) and (2) at the outlet temperature of the first cooling step.

The condenser of U.S. Pat. No. 4,046,867 is especially prone to cause changes in reactor temperature due to inconsistent flow of liquid sulfur from its condenser. As accumulations of high viscosity liquid sulfur fall from the condenser either directly back into the reactor or into the equilibrator pool of sulfur, the reactor receives surges of cool liquid sulfur. When external heat exchange or direct quench is employed for controlling the temperature of the liquid sulfur pool in the reactor, special care must be taken to not allow the temperature to fall below the auto-ignition temperature. Also, the practice of this patent requires withdrawal and cooling of liquid sulfur from the sulfur dioxide generator, requiring the pumping of relatively large quantities of high viscosity sulfur. Such pumping typically consumes significant amounts of electrical power and makes the process less efficient.

Thus, control of reactor temperature for U.S. Pat. No. 4,046,867 is necessarily difficult. The present invention effectively eliminates the problem of inconsistent flow of cooled liquid sulfur to the reactor by maintaining a high temperature recycle of sulfur through the reactor to which a relatively small amount of cooler liquid sulfur is added. The added cooler sulfur then does not adversely affect reactor temperature. Compared to the rate of liquid sulfur flowing from the first cooling step to the first drum, the rate of liquid sulfur from the second cooling step is very low. Because the rate of the cooler liquid sulfur stream from the second cooling step is low compared to the hotter liquid from the first cooling step, the temperature of liquid sulfur in the first drum is maintained near the outlet temperature of the first cooling step. Thus, the reactor receives a steady flow of cooled liquid sulfur to be (1) consumed in the generation of sulfur dioxide or (2) vaporized to remove heat of combustion.

The present invention is especially advantageous where pure oxygen is used as the oxygen-containing gas in the reactor. Pure oxygen is used as the oxygen-containing gas to improve recovery and purification of the sulfur dioxide from the vapor effluent of the reactor. In such a case, when compared to the use of air as the oxygen-containing gas, sulfur vaporization from the reactor is increased.

In contrast, when air is used for the oxygen-containing gas stream, the nitrogen entering with the air absorbs part of the heat of combustion in the reactor. The nitrogen then becomes part of the vapor stream exiting the reactor. When pure oxygen is used as the oxygen-containing gas stream, the heat of combustion in the reactor formerly absorbed by nitrogen must be absorbed by the vaporization of additional liquid sulfur, increasing the amount of sulfur to be condensed in the first cooling step. Because prior art condensers experience difficulty in the draining of condensed sulfur at high viscosity, that difficulty is increasingly severe when pure oxygen is used as the oxygen-containing gas and the amount of sulfur condensing in the condenser increases.

DETAILED DESCRIPTION OF THE INVENTION

Figure 1:
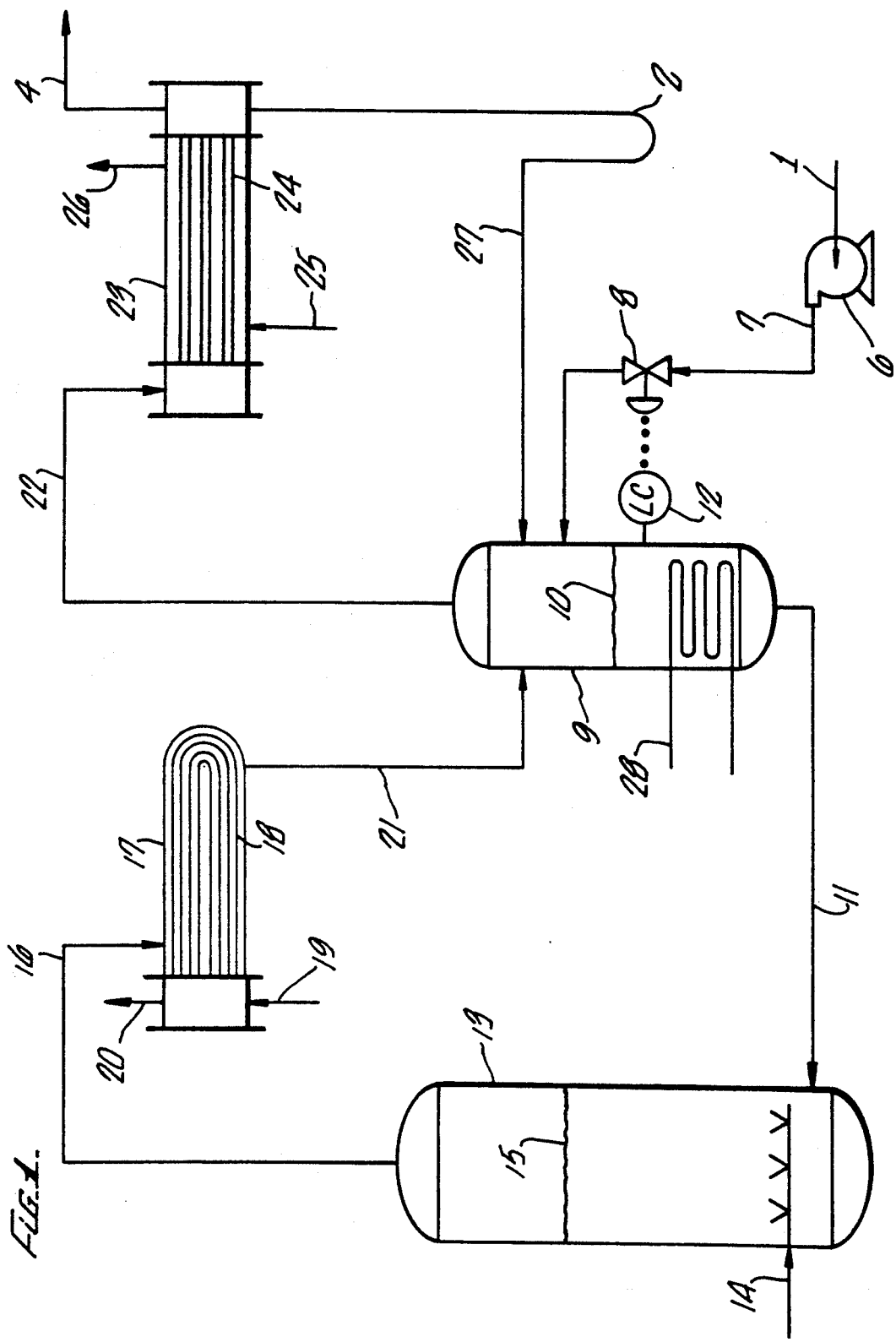
FIG. 1 is a schematic diagram of one embodiment of the method of this invention.

Liquid sulfur in the temperature range 310° to 600° F. rises in viscosity from about 2000 cps at the limits of that temperature range to nearly 100,000 cps within the range (see FIG. 5 of Paskall's article "Sulfur Condenser Function and Problem Areas"). The Calabrian process and that of U.S. Pat. No. 4,046,867 use condensers that condense sulfur within that high viscosity temperature range.

Liquid sulfur cooled to the high viscosity temperature range does not flow freely from indirect heat transfer equipment for several reasons. Liquid sulfur at 100,000 cps within the heat transfer equipment is virtually solid and will tend to form accumulations of liquid sulfur, where the accumulation amount, form, and ability to flow smoothly is dependant on the heat transfer equipment design. The configuration of the heat transfer surfaces of the equipment may tend to promote the retention of liquid sulfur accumulations. Narrow passageways for flow of the liquid sulfur will prevent the accumulations from moving smoothly toward the outlet of the heat transfer equipment until the accumulations have cooled to below the high viscosity transition. Accumulations may also cause channeling of the vapor through the heat transfer equipment and reduce heat transfer surface available for cooling.

The present invention recognizes that the high viscosity transition of liquid sulfur is required at some point in the process for the following reason. The desired product of the present invention is a sulfur dioxide containing gas with low levels of elemental sulfur. Cooling of the sulfur dioxide containing gas to about 300° F. is required to reduce by condensation its elemental sulfur to acceptable limits. Meeting a closer tolerance for that residual sulfur in the sulfur dioxide containing gas is specifically the subject of U.S. Pat. No. 4,046,867. Other methods not the subject of this patent may also be employed.

Given that the sulfur dioxide containing gas must be cooled to about 300° F. and that some heat transfer surface must be subject to the high viscosity transition of liquid sulfur, the present invention contains a condenser where the sulfur dioxide containing gas is cooled from above 600° F. to below 310° F. The fact that a very small portion of the sulfur vaporized in the reaction zone is condensed in this second condenser and passes through the high viscosity region is a key feature of this invention.

Further, the amount of sulfur being condensed in the second condenser is a very small portion of the total flow of vapor and condensing sulfur passing through the second condenser. Such a result is in contrast to the prior art condenser of U.S. Pat. No. 4,046,867, where the amount of sulfur condensed is quite high relative to equivalent sulfur dioxide production and vapor flow from the condenser outlet. Where a condenser cools vapor through the high viscosity temperature range, reducing the amount of condensing sulfur relative to the vapor flow through a condenser improves operability in the following manner.

A film of condensed sulfur forms on the surface of the heat transfer surface of the condenser, maintained at only a few degrees higher than the boiler feed water on the other side of the heat transfer surface. If that layer of liquid sulfur is relatively thin, cooling of the vapor occurs more quickly and requires less heat transfer area than for such a heat transfer area where the heat transfer surface is covered with a thicker layer of liquid sulfur. Both the second condenser of the present invention and the condensers of the prior art cool the entering vapor to less than 300° F. Where, for a condenser, substantially more sulfur must condense through a high viscosity range per volume of non-condensable, sulfur dioxide vapor, condensed sulfur will form a thicker film on the heat transfer surface and inhibit cooling of the vapor.

The present invention is directed primarily to a first cooling step where the hot combustion product gas issuing from the surface of the liquid sulfur pool in the reactor is cooled to some temperature higher than 600° F., preferably to 800° F. where the reactor operates at 80 psig. For the condenser operating at an outlet temperature of over 600° F., the present invention is further directed toward the separation of the condensed sulfur and vapor effluent and allowing the condensed sulfur to return by gravity to the reactor.

A recycle of sulfur is thus created by (1) gravity flow of liquid sulfur to the reactor, (2) vaporizing the liquid sulfur in the reactor by absorbing the heat of combustion taking place there, (3) condensing the liquid sulfur at some temperature above 600° F., (4) separating the condensed sulfur from the vapor, and (5) flowing the liquid sulfur to the reactor. At no point in the recycle is liquid sulfur allowed to approach the upper limit temperature of the high viscosity transition range.

Of course, sulfur is continuously withdrawn from this system defined by the reactor and high temperature recycle of sulfur. In the vapor leaving the drum flowing liquid sulfur to the reactor, sulfur leaves the system as (1) sulfur dioxide produced in reactor combustion and (2), compared to the sulfur condensed in the first cooling step, a relatively small amount of uncondensed, elemental sulfur. So, for the limited portion of this invention defined by the reactor and the high temperature recycle, the withdrawn sulfur in the sulfur species of the vapor stream leaving the limited system is replaced by adding liquid sulfur to the first drum, the drum flowing liquid sulfur to the reactor.

Because the amount of added liquid sulfur is small compared to that amount draining to the drum from the first cooling step, the temperature of the mixed liquid sulfur in the drum remains above the upper limit of the high viscosity transition. This anticipates and eliminates any problems that might arise if the drum temperature were to drop below 600° F. and gravity flow to the reactor were to be inhibited by high viscosity liquid sulfur.

Where a gravity flow connection is maintained between two vessels beneath their liquid levels and the vessels are held at the same pressure, the liquid levels of the two vessels will be nearly equal. In the preferred embodiment of the present invention, the reactor and the first drum of the present invention share such a gravity flow connection and thus the level of liquid sulfur in the two vessels is nearly the same. Liquid sulfur height in the first drum must be slightly higher than that of the reactor to flow liquid sulfur from the lower pressure first drum to the slightly higher pressure reactor. As vaporized sulfur is withdrawn from the liquid sulfur pool of the reactor, its liquid sulfur level decreases and causes liquid sulfur to flow to it from the first drum with its temporarily higher liquid sulfur level.

The vapor from the first drum is cooled to below 310° F. in a second cooling step. While the second cooling step condenses sulfur through the range of temperatures where liquid sulfur reaches high viscosity, the problems associated with the free flow of condensed sulfur are virtually eliminated because (1) the flow of non-condensing vapor is relatively high compared to the amount of sulfur condensing in the second cooling step, providing a stronger vapor sweeping of the condensed sulfur from the heat transfer surface and (2) the film temperature of the condensing sulfur at the heat transfer surface is maintained below 310° F. in a low viscosity range, assuring that liquid sulfur will not accumulate on that surface. Preferably, the second cooling step is performed on the tube side of a condenser where the vapor and liquid may be separated in the outlet head, and the liquid can be flowed to the first drum.

Alternatively, the entire liquid sulfur and vapor effluent of the second cooling step may enter a second device for separating liquid and vapor, which could also serve as a main sulfur storage drum for the process. The second such device is typically maintained at a temperature between 248° and 300° F. and heated with tank heating coils if necessary. From the second device separating vapor and liquid, liquid sulfur is pumped to the first drum on demand of its level controller or flows by gravity.

In addition, the present invention improves the way the heat of combustion from the reactor is used to generate steam. For the present invention, the effluent temperature of the first cooling step (preferably 800° F.) is much higher than that of the second cooling step (preferably 300° F.). Thus, high pressure (300–1500 psig) steam can be generated from the first cooling step. Such high pressure steam is of greater value than the low pressure (25 psig) steam potentially generated by the second cooling step. In an alternate embodiment for high pressure steam generation, the present invention (1) passes molten salt through the condenser in the first cooling step to cool the vapor from the reactor, (2) subsequently cools the molten salt in a high pressure steam generator, and (3) returns the molten salt to the first condenser. This is an indirect method of steam generation from the heat transferred to the molten salt in the first cooling step. The indirect method of steam generation is used to prevent high pressure, water leak contamination of the sulfur dioxide containing gas passing through the first cooling step. Also, by restricting the temperature rise of the molten salt passing through the first cooling step, the indirect method of steam generation provides that the first cooling step will be done at a relatively constant condensing temperature. An indirect steam generation isn't necessary for the second condenser. The pressure of the steam generated is typically lower than the process fluid and thus in those circumstances will not contaminate the sulfur dioxide containing gas passing through it. Also, the boiling of water to produce steam provides the desirable constant condensing temperature at the low viscosity zone below 310° F.

The present invention is now discussed in a preferred embodiment in reference to FIG. 1. The process streams entering the system are the (1) make-up liquid sulfur stream 1, composed of liquid sulfur at 240° to 310° F., and (2) the oxygen-containing gas 14, composed of oxygen from 21 to 100 mole percent and the remainder as inerts such as nitrogen. The only process stream leaving the system is the sulfur dioxide containing gas stream 4, composed of all the sulfur dioxide formed in reactor 13, any inerts entering reactor 13 with oxygen-containing gas 14, and a small amount of elemental sulfur. Heat transfer streams 19 and 20 may be either boiler feed water, steam, heat transfer fluids such as Dowtherm or Therminol, or molten salt. Heat transfer streams 25 and 26 are boiler feed water.

The following description is a preferred embodiment of the present invention producing 50 tons per day of sulfur dioxide in the sulfur dioxide containing stream 4 and using pure oxygen in the oxygen-containing gas 14.

Make-up liquid sulfur stream 1 contains sufficient elemental sulfur to replace the sulfur in the sulfur species leaving the system in the sulfur dioxide containing gas 4. Make-up liquid sulfur stream 1 is introduced into drum 9 at a temperature of 270° F. Drum 9 also receives the liquid effluent at 270° F. of second cooling zone 23 through conduit 27. The vapor portion of the effluent of second cooling zone 23 is separated from the liquid sulfur and exits second cooling zone 23 as sulfur dioxide containing stream 4.

Make-up liquid sulfur stream 1 is fed to the suction of pump 6, where it is increased in pressure (1) to approximately 15 psi above the vapor pressure of drum 9 plus (2) the equivalent of the static head of the sulfur between the elevation of the liquid level in drum 9 and the elevation of liquid sulfur introduced to conduit 7. The amount of liquid sulfur pumped to drum 9 is controlled by restricting the flow of liquid sulfur in conduit 7 at control valve 8. Control valve 8 is in turn regulated by level controller 12 which maintains the level of liquid sulfur pool 10 in first drum 9. The liquid sulfur flowing through conduit 7 and conduit 27 is introduced to first drum 9 above the level of the liquid sulfur pool 10. The temperature of liquid sulfur pool 10 is 740 F and the liquid sulfur added from conduit 7 is 270° F. Liquid sulfur from conduit 7 added to first drum 9 is thus heated to 740° F. on mixing with the top portion of liquid sulfur pool 10 and passes through the high viscosity transition temperature range of 310° to 600° F. while in that top portion. The heating and viscosity transition thus does not take place near the inlet nozzle of conduit 7 into first drum 9, a viscosity transition that could otherwise potentially plug conduit 7 or 27. The reason for introducing the liquid sulfur of conduit 7 and 27 into the vapor portion of first drum 9 is to minimize its heating near the point of its entry into the drum. The vapor in first drum 9 has relatively low thermal mass compared with that of the liquid sulfur from conduit 7, so that liquid sulfur introduced into the drum from conduit 7 will not be significantly heated until it reaches liquid sulfur pool 10.

A second stream enters first drum 10 from first cooling zone 17 through conduit 21. The vapor and liquid sulfur effluent of first cooling zone 17 is at 800° F. and is separated in first drum 9 so that its liquid sulfur mixes with the top portion of the liquid sulfur in the liquid sulfur pool 10. The agitation of the top portion of liquid sulfur pool 10 by the mixing there of the liquid sulfur from first cooling zone 17 speeds the heating of the cooler sulfur entering first drum 9 through conduit 7 and 27. Thus, a cooler layer of liquid sulfur is prevented from forming on the top portion of liquid sulfur pool 10. Such a cooler layer might have otherwise cooled to below 600° F. and become highly viscous.

Liquid sulfur is withdrawn by gravity from first drum 9 through conduit 11. The liquid sulfur flowing through conduit 11 enters reactor 13 beneath the surface of liquid sulfur pool 15. Oxygen-containing gas 14 is also introduced into reactor 13 beneath the surface of liquid sulfur pool 15.

Liquid sulfur pool 15 is maintained at a depth sufficient to combust all the oxygen in the oxygen-containing gas 14 beneath the surface of the pool. That liquid sulfur depth is controlled indirectly by level controller 12 of drum 9 in the following manner.

Sulfur is continually removed from liquid sulfur pool by (1) vaporization of the liquid sulfur and (2) reaction of the liquid sulfur to sulfur dioxide. Both of the vaporized sulfur and the sulfur dioxide exit liquid sulfur pool 15 and are collected in conduit 16. The sulfur withdrawn with such vapor is replaced by the flow of liquid sulfur from drum 9. Because liquid sulfur flows by gravity from drum 9 to reactor 13, there will be little difference in the liquid sulfur levels of drum 9 and reactor 13. Thus, as liquid sulfur is removed from liquid sulfur pool 15, the level of liquid sulfur pool 10 will necessarily be lowered as well. Level controller 12 will act to supply additional liquid sulfur to drum 9 with liquid sulfur from make-up liquid sulfur stream 1.

Liquid sulfur pool 15 is maintained at a temperature near or at its boiling point which for all pressures above atmospheric pressure is also above the auto-ignition temperature of oxygen-bearing gases with greater than 21 percent oxygen and sulfur for reactor 13 conditions. The depth of liquid sulfur pool 15 is sufficient to permit complete combustion of oxygen from the oxygen-containing gas 14 before it reaches the surface of the liquid sulfur. In addition, oxygen-containing gas 14 is introduced to reactor 13 near the vertical centerline of the vessel. Oxygen-containing gas 14 thus rises through liquid sulfur pool 15 and the transfer of its heat of combustion is substantially limited to the vertical, cylindrical-shaped portion of liquid sulfur through which the gas passes. This creates a zone of liquid sulfur between the vessel wall and the boundary of the vertical, cylindrical-shaped combustion zone where the temperature of the liquid sulfur is limited to the boiling point of its liquid sulfur.

In the present embodiment, reactor 13 is maintained at 80 psig and liquid sulfur pool 15 will rise to the boiling point of its sulfur at that pressure or approximately 1110° F. as the heat of combustion is transferred to and vaporizes the liquid sulfur of liquid sulfur pool 15. This temperature is substantially above the auto-ignition temperature of sulfur and oxygen at 80 psig. Vapor leaving the surface of liquid sulfur pool 15 separates from the liquid sulfur in the vapor space of reactor 13 and then passes to first cooling zone 17 through conduit 16. The vaporized sulfur in the vapor of conduit 16 is 31,020 lb/hr for a sulfur dioxide production of 4,167 lb/hr sulfur dioxide.

First cooling zone 17 is a heat exchanger indirectly transferring heat from the vapor of conduit 16 to molten salt entering conduit 19 at 725° F. and leaving by conduit 20, heated to 775° F. The stream of conduit 16 is sulfur containing vapor at 1110° F. and is to be cooled to 800° F. For this example where the sulfur dioxide production equals 50 tons per day, the cooling duty of first cooling zone 17 is 7.39 MMBtu/hr and 29,022 lb/hr of sulfur is condensed. Thus, almost 94 percent of the sulfur vaporized from liquid sulfur pool 1 is condensed in first cooling zone 17. No sulfur dioxide is condensed in first cooling zone 17.

The heat transfer surface in cooling zone 17 is not subject to temperatures less than 725° F. when molten salt is used as the heat transfer medium to cool that cooling zone. Therefore, liquid sulfur condensation in first cooling zone 17 does not experience a high viscosity transition and cause an accumulation of liquid sulfur on the heat transfer surfaces or in the free area of cooling zone 17. The heated molten salt leaving first cooling zone 17 is sent to a steam generator (not shown in FIG. 1) where high pressure (300 to 1500 psig, and preferably at 600 psig) steam is raised against the molten salt being cooled to 725° F. The molten salt is then returned to first cooling zone 17. The pressure of steam raised is a matter of convenience and is normally set at the same level as that raised elsewhere in the facility where this invention is employed.

The mixture of condensed sulfur and vapor exits first cooling zone 17 and enters drum 9 through conduit 21. The sulfur condensed in first cooling zone 17 is separated from the vapor in drum 9. The vapor effluent of drum 9 is introduced to second cooling zone 23 through conduit 22.

This vapor stream of conduit 22, at 740° F., is cooled in second cooling zone 23 to 270° against boiler feed water at 260° F. The boiler feed water enters second cooling zone 23 through conduit 25 and leaves through conduit 26 as steam and liquid water. The temperature of the heat transfer medium used in second cooling zone 23 is kept below 300° F. to prevent its sulfur film temperature from rising to the high viscosity range. For this example, cooling duty for second cooling zone 23 is 0.91 MMBtu/hr. Since the total cooling duty for both first cooling zone 17 and second cooling zone 23 is 8.30 MMBtu/hr, the cooling duty of first cooling zone 17 is about 89 percent of that total.

The liquid sulfur and vapor effluent of second cooling zone 23 are separated in the end space of second cooling zone 23. The vapor exiting that end space contains all the sulfur dioxide produced in reactor 13 with trace amounts of elemental sulfur. Liquid sulfur exits the end space of second cooling zone 23 through conduit 27 and descends to liquid seal 2. Liquid seal 2 prevents the passing of vapor from drum 9 through conduit 27 so that it bypasses the heat transfer surface of second cooling zone 23.

Second cooling zone 23 condenses essentially all the sulfur from the vapor of conduit 22. Thus, conduit 2 passes the remaining 1998 lb/hr of liquid sulfur back to drum 9 and all the sulfur dioxide produced in reactor 13, 4,167 lb/hr, is recovered in the vapor of conduit 4.

An alternate embodiment is preferred for the present invention when air is to be used as the oxygen-containing gas injected to reactor 13. In such a case, the heat of combustion generated in reactor 13 is absorbed by the inerts entering reactor 13 with the air as well as by the sulfur dioxide generated there and vaporizing sulfur. For this reason, significantly less sulfur is vaporized from liquid sulfur pool 15 when air, as opposed to pure oxygen, is used as the oxygen-containing gas.

For this embodiment, as for the first preferred embodiment, first cooling zone 17 removes the major portion of vaporized sulfur from the vapor effluent of reactor 13 and the effluent temperature of first condensation zone is again preferably 800° F. However, the amount of sulfur condensed in first cooling zone 17 and flowing to drum 9 at 800° F. is not sufficient to maintain liquid sulfur pool 10 at a temperature above the upper range of the high viscosity transition. The cooler sulfur flowing to drum 9 through conduits 7 and 27 mixes with the hotter liquid sulfur condensed in first cooling zone 17 to form liquid sulfur pool 10. Thus, without supplementary heating, liquid sulfur pool 10 will become so viscous that flow of liquid sulfur to reactor 13 may slow and/or become inconsistent. Drum heater 28 maintains the temperature of liquid sulfur pool 10 above the upper range temperature of the high viscosity transition for liquid sulfur, preferably at 800° F. Thus, the majority of sulfur vaporized in reactor 13 can, as shown in the first preferred embodiment, be condensed in a high temperature condensation step to avoid the high viscosity transition of liquid sulfur on heat transfer surfaces performing the condensation, and the sulfur leaving drum 9 is also maintained at a high temperature so that the sulfur flowing in conduit 11 to reactor 13 is also in a region of low viscosity.

Figure 2:
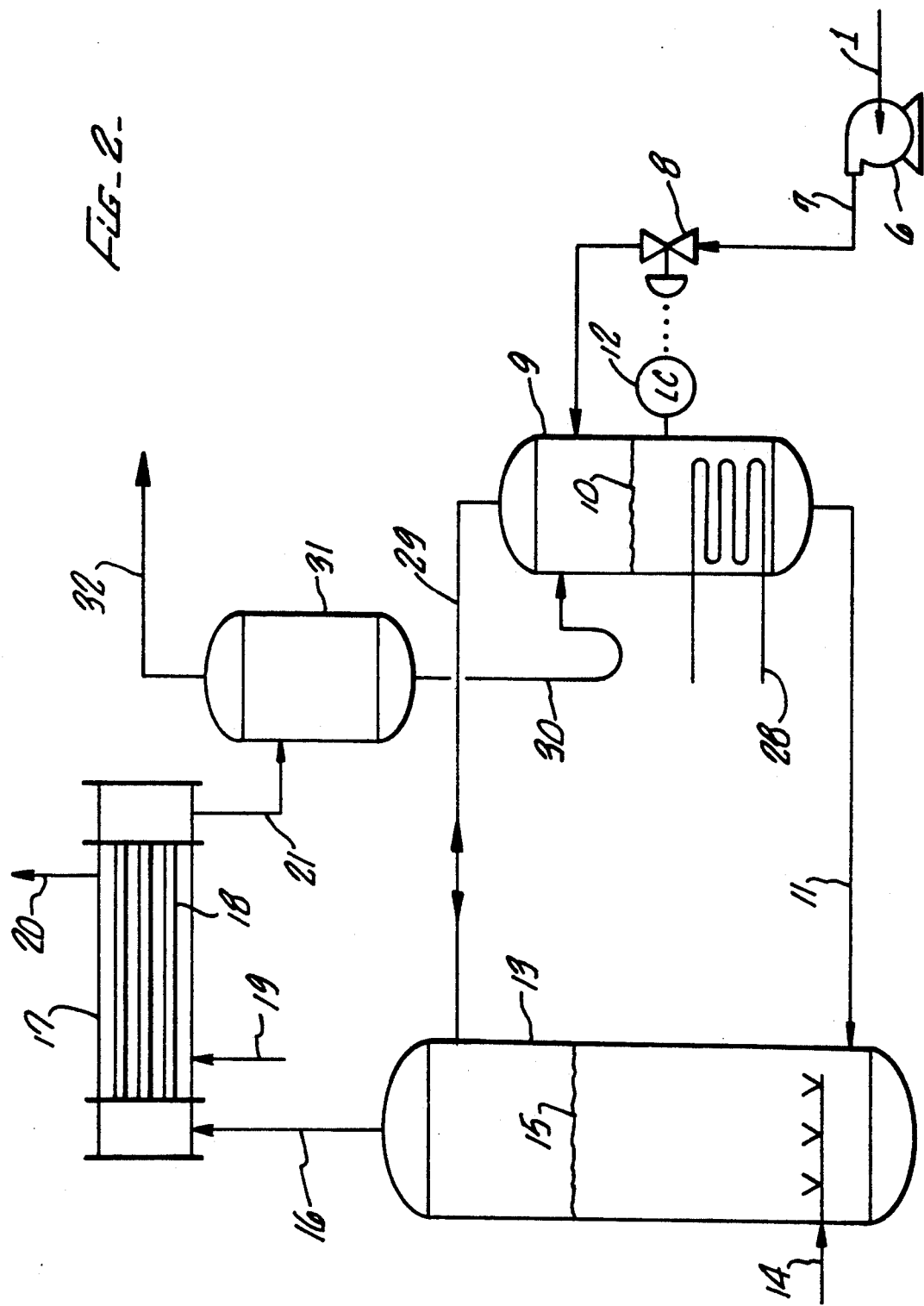
FIG. 2 is a schematic representation of an additional embodiment of the invention.

Another embodiment of the present invention is shown in FIG. 2 and is now described. The items of Figure 1 and 2, having identical item numbers, share essentially the same function.

Air or oxygen-enriched air is used as the oxygen-containing gas injected through conduit 14 to reactor 13. As described in the preceding embodiment, less sulfur is vaporized from the liquid sulfur pool of the reactor when air or oxygen-enriched air is used as the oxygen-containing gas than when pure oxygen is used for that purpose. In addition, reducing vaporization of sulfur in the reactor and increasing the noncondensables in the oxygen-containing gas injected into the reactor significantly increases the ratio of vapor to condensing sulfur for the stream passing through the first condenser. In FIG. 2, the first condenser is represented by first cooling zone 17.

When the ratio of vapor to condensed sulfur is sufficiently high for the stream passing through first condensation zone 17, liquid sulfur may be cooled through its high viscosity transition range without creating accumulations of viscous liquid sulfur on the heat transfer surface area. The force of the vapor sweeping over the heat transfer surface area clears that surface area of condensing sulfur and high viscosity accumulations of liquid sulfur. This benefit is advantageously recognized in the present embodiment by cooling reactor vapor in first cooling zone 17 to between 250°-300° F., preferably approximately 270° F.

Therefore, for the circumstances where (1) the oxygen-containing gas is air or oxygen-enriched air and (2) a sufficiently high vapor to condensing sulfur ratio is maintained, only one cooling zone is needed to cool reactor vapor to between 250°-300° F.

Again referring to the embodiment shown in FIG. 2, effluent from first cooling zone 17 is introduced to drum 31 through conduit 21. In drum 31, vapor and liquid sulfur of the stream from conduit 21 separate. The vapor leaving drum 31 through conduit 32 contains all the sulfur dioxide produced in reactor 13. The liquid sulfur exiting drum 31 descends through conduit 30 to a liquid seal before entering drum 9. The liquid sulfur from conduit 30 mixes in drum 9 with make-up liquid sulfur added to the drum through conduit 7.

The temperature of liquid sulfur pool 10 is maintained at above 600° F., preferably at 800° F., by drum heater 28. Thus, the two liquid sulfur streams entering drum 9 at low temperature, in the range 250°-300° F., are heated through the high viscosity transition range in drum 9. If the liquid sulfur of drum 9 were not heated, the liquid sulfur flowing through conduit 11 to reactor 13 would enter reactor 13 at about 250°-300° F. In such a case, heating of liquid sulfur through the high viscosity transition range would take place at the entry point of conduit 11 to reactor 13 and the free flow of liquid sulfur would be slowed. Such a result is eliminated by maintaining liquid sulfur pool 10 at above 600° F.

The vapor spaces of drum 9 and reactor 13 are connected by conduit 29 so that the pressure in the two vessels is essentially equal. Liquid sulfur pool 10 is connected to liquid sulfur pool 15 by conduit 11 in a manner such that the liquid level in drum 9 is essentially equal to the liquid level in reactor 13. Thus, controls affecting the level of liquid sulfur in drum 9 also affects the level of liquid sulfur in reactor 13. As described in the above embodiments, level controller 12 performs such function.

The description of this preferred embodiment is not to be construed as limiting the scope of the present invention. Persons skilled in the art will be aware of variations in the preferred embodiment. Those variations are intended as being included in the scope of the present invention. Further processing as taught in the prior art previously cited may be required to remove the final traces of elemental sulfur from the sulfur dioxide containing stream of conduit 4 in FIG. 1 or conduit 32 in FIG. 2.

What is claimed is:

1. A method for the production of sulfur dioxide, comprising:
    combusting boiling sulfur with an oxygen-containing gas within a first liquid sulfur pool to produce a sulfur dioxide;
    continuously removing sulfur laden vapor effluent from the first liquid sulfur pool;
    passing the vapor effluent to an indirect cooling zone, wherein the vapor effluent is cooled to not below 600° F. while forming condensed sulfur having a temperature above 600° F.;
    producing a sulfur depleted vapor by separating said condensed sulfur from the vapor in said cooled effluent; and
    recycling said condensed sulfur at a temperature not below 600° F. to the first liquid sulfur pool for conversion to sulfur dioxide or vaporization.

2. The method of claim 1 wherein separation is conducted in a zone separate from said cooling zone.

3. The method of claims 1 or 2 wherein said sulfur depleted vapor is further cooled to between 250° F. to 300° F. to remove additional sulfur.

4. The method of claims 1 or 2 wherein the oxygen-containing gas is pure oxygen.

5. The method of claims 1 or 2 wherein the oxygen-containing gas is air or oxygen-enriched air.

6. The method of claims 1 or 2 wherein the pressure in the combustion zone is maintained between zero and 150 psig.

7. The method of claim 3 wherein the additional condensed sulfur is separated and flows to a second liquid sulfur pool.

8. The method of claim 7 wherein make-up sulfur is added to the second liquid sulfur pool with sufficient heat to maintain the sulfur pool at a temperature above 600° F.

* * * * *